(12) United States Patent
Brooks

(10) Patent No.: US 9,743,659 B2
(45) Date of Patent: Aug. 29, 2017

(54) ROTARY AUGER SUPPORT

(71) Applicant: Kevin Brooks, Leitchfield, KY (US)

(72) Inventor: Kevin Brooks, Leitchfield, KY (US)

(73) Assignee: Decoy Stake Solutions, LLC, Leitchfield, KY (US)

( * ) Notice: Subject to any disclaimer, the term of this patent is extended or adjusted under 35 U.S.C. 154(b) by 0 days.

(21) Appl. No.: 14/999,091

(22) Filed: Mar. 29, 2016

(65) Prior Publication Data
US 2016/0363261 A1    Dec. 15, 2016

Related U.S. Application Data

(63) Continuation-in-part of application No. 14/121,468, filed on Sep. 9, 2014, now Pat. No. 9,347,733, which is a continuation-in-part of application No. 13/998,981, filed on Dec. 30, 2013, now abandoned.

(51) Int. Cl.
A45F 3/44    (2006.01)
A01M 31/00   (2006.01)

(52) U.S. Cl.
CPC .................... A01M 31/00 (2013.01)

(58) Field of Classification Search
CPC ..................................... A01M 31/00
See application file for complete search history.

(56) References Cited

U.S. PATENT DOCUMENTS

| | | |
|---|---|---|
| 32,225 A | 4/1861 | Dotson |
| 168,890 A | 10/1875 | Field |
| 345,877 A | 7/1886 | Brainard |
| 907,799 A | 12/1908 | Hawley |
| 1,562,343 A | 11/1925 | Post |
| 2,269,996 A | 1/1942 | Milton |
| 2,447,444 A | 8/1948 | Waite |
| 2,563,159 A | 8/1951 | Louis |
| 2,901,789 A | 9/1959 | Frank |
| 3,688,454 A | 9/1972 | Wolfcarius |
| 4,928,418 A | 5/1990 | Stelly |
| 5,098,057 A | 3/1992 | Gran |
| 6,116,760 A | 9/2000 | Cox |
| 6,412,236 B1 | 7/2002 | Johnson |
| 6,481,147 B2 | 11/2002 | Lindaman |
| 6,487,977 B1 | 12/2002 | Williams |
| 6,698,132 B1 | 3/2004 | Brint |
| 6,810,630 B2 | 11/2004 | Chizmas |
| 6,901,693 B1 | 6/2005 | Crowe |
| D550,071 S | 9/2007 | Powell |
| D554,980 S | 11/2007 | Mihelis |
| 7,493,873 B2 | 2/2009 | Petersen |
| 8,230,638 B1 | 7/2012 | Dunaway |
| 2005/0268522 A1 | 12/2005 | Foster |
| 2016/0270518 A1* | 9/2016 | Brooks ............. A45F 3/44 |

* cited by examiner

Primary Examiner — Amy Sterling
(74) Attorney, Agent, or Firm — Carrithers Law Office PLLC

(57) ABSTRACT

A rotary auger support for mounting and removably holding a articles or devices upright on the ground. The includes an upright rod with a helical coil comprising a rectangular or square cross section defining flights forming an auger base having a point at the lower distal end to be fixedly and removably screwed into the ground to support the in an upright position.

7 Claims, 3 Drawing Sheets

ROTARY AUGER SUPPORT

CROSS REFERENCE TO RELATED APPLICATIONS

This application is a continuation in part of U.S. application Ser. No. 14/121,468 filed on Sep. 9, 2014 which is a continuation in part of U.S. application Ser. No. 13/998,981 filed on Dec. 30, 2013 claims priority from both applications which are incorporated herein in their entirety.

TECHNICAL FIELD

The present invention relates to an having an integral handle and auger for supporting an object on an adapter in an upright position in the ground.

BACKGROUND OF THE INVENTION

The portable and reusable auger of the present invention can be used in combination with an integrated loop handle which can be installed in the ground with no tools by twisting and rotating the handle screwing the auger base into the ground.

SUMMARY OF THE INVENTION

A rotary auger for supporting or mounting and removably holding a articles or devices upright on the ground. The auger includes an upright rod with a helical helix coil having a point at the lower distal end to be fixedly and removably screwed into the ground to support the in an upright position. The auger vertical shaft forms a cork screw or a helical coil formed in the bottom end.

A looped handle may be formed integrally within the upper end of the shaft or rod extending from the auger with an vertically disposed "S" shaped loop formed in the center of the for enabling the screwing of the cork screw into the ground for vertical stabilization of the stake. The bottom helical coil ends with a sharp wedge or pointed tip for easing the installation into the ground.

A preferred embodiment of the helical auger. A helix is a curve in three dimensional space having a tangent line and any point which makes a constant angle with a fixed line called the axis. The pitch of a helix is the width of one complete helix turn, measured parallel to the axis of the helix. A circular helix has a constant radius and constant band curvature and constant torsion.

The present invention comprises a helical auger including an inner bend diameter of a selected size such as ¼ inch bar stock, 3/16 inch bar stock, ½ inch bar stock, ⅝ inch bar stock, and ⅜ inch bar stock; a helical pitch of 2.0 for 3.5 revolutions; a variable pitch of 3.0 for 0.25 revolutions; and a pitch diameter of 1.375 inches having a helical pitch of 2.0.

Thus in order to obtain a specific 30 degree angle at the bottom of the screw, the helical pitch as to vary from a constant 2 inches per revolution to 3 inches per revolution from section 2 to section 3. Thus the auger has a helical pitch of 2.0 at section 1 for 3.5 revolutions; a helical pitch at section 2 of 2.0 which changes to a variable pitch of 3.0 at section 3 for 0.25 revolutions. The pitch diameter is 1.375 inches.

It is an object of this invention to provide a portable and reusable auger which includes a helical coil or helix having a point at a distal end.

It is an object of this invention to provide an integral crank handle for the purpose of screwing auger portion into the ground.

It is an object of the present invention to form an integral one piece auger having a helical helix formed of stock having a square cross-section.

It is an object of the present invention to form an integral one piece auger having a helical helix formed of stock having a rectangular cross-section.

It is an object of the present invention to form an integral one piece auger having a helical helix formed of stock having a rectangular cross-section forming a ribbon.

A preferred embodiment of the present invention comprises or consists of a rotary auger support comprising or consisting of a selected length of bar stock having a square cross sectional area including a bottom portion bent into a helix, a vertical straight top segment, a neck portion extending downward from the vertical straight top portion, a main body portion extending downwardly from the neck portion, the main body portion comprising a helical helix coil extending downward therefrom a selected distance, a distal end segment comprising a half helix extending downward from the main body portion, and the distal end segment including a point for penetration into the ground.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

In accordance with the present invention, there is provided a rotary auger having a top end defining a vertical shaft The integral handle tie down rest is located at an upper end of a shaft extending upwardly from a helix auger wherein the handle tie down rest can be bent at a selected angle to hold the tie down in a selected position with respect to the surface of the ground.

Figure 4:
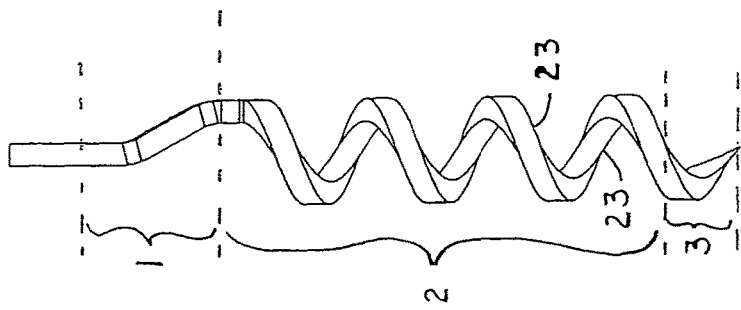
FIG. 4 is a left perspective rear view of a rotary auger support having a rectangular, or square cross section showing the straight top portion defining a tubular adapter extending from the top for cooperative engagement with a corresponding tube or bar stock shaft of an article to be supported thereon.
Figure 3:
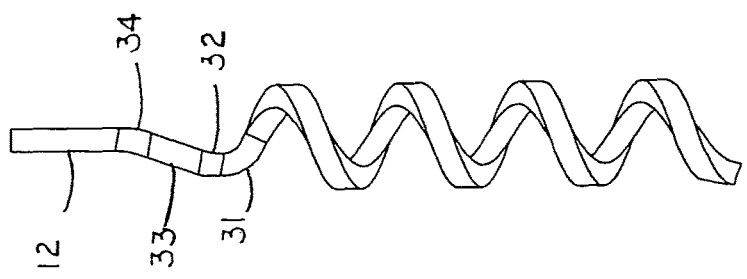
FIG. 3 is a left perspective rear view of a rotary auger support having a rectangular, or square cross section showing the straight top portion defining a tubular adapter extending from the top for cooperative engagement with a corresponding tube or bar stock shaft of an article to be supported thereon.

The rotary auger support 10 includes an above ground upright rod or shaft top portion 12 having an offset neck 14 connecting to a main body portion 2 comprising a plurality of helixes 16. A distal end segment 3 comprises a half helix ending in a sharp point 18. A main body portion helixes 16 is comprised of bar stock having a square cross sectional area. The corners 21 or the square bar stock form cutting edges 23 when the stock is bent or formed into a helix. One preferred embodiment of the instant invention includes a main body portion 2 having three full helixes and a tip portion 3 comprising a half helix. The neck 14 of the rotary auger support 10 is angled inwardly toward the center of the main body portion 2 in order to center the shaft top portion 12 with respect to the main body portion 2. As best shown in FIG. 3, the neck portion includes a helix first segment 31, a short straight inward angled second segment 32, a straight angled third segment 33, a short straight outward angled fourth segment 34, connecting to a vertical straight top segment 12 of a desired length.

The rotary auger 10 having a bottom portion for insertion into the ground comprises a helical coil 16 having a cutting edge which functions as a plurality of flights forming an auger 10 having cutting edges with a wedge point 18 at the lower distal end to be fixedly and removably screwed into the ground 20 to support the 10 in an upright position.

The cutting edges of the helix enable the auger to cut through soil and debris for ease of rotation and deep ground penetration which includes the desirable features of helix flights. Moreover, the auger of the present invention is an improvement over the flights of conventional augers in that the narrow diameter of the stock and diameter of the flights enables the auger to cut and drill through small openings in rocky soil and wedge between rocks. Moreover, the rotary auger support 10 of the present invention can be rotatably inserted into hard clay which would resist penetration by an auger having flights or a helix auger comprising round stock.

Figure 6:
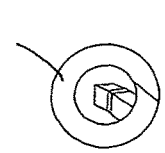
FIG. 6 is a bottom end view of the rotary auger support of FIG. 1.
Figure 2:
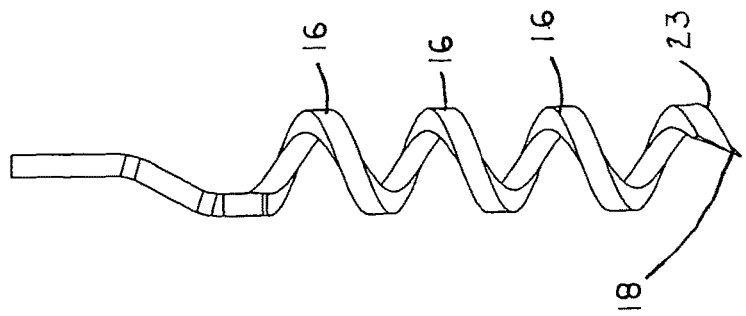
FIG. 2 is a rear perspective view of the rotary auger support shown in FIG. 1.
Figure 5:
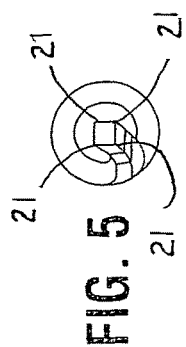
FIG. 5 is a top end view of the rotary auger support shown in FIG. 1.
Figure 1:
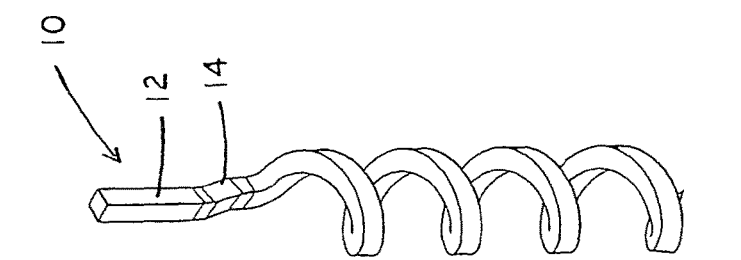
FIG. 1 is a perspective view of a rotary auger helix having a straight top portion and a main body portion comprising a helix formed of stock having a square cross-section having a distal point cut creating a wedge shaped tip.

A preferred embodiment of the helical auger includes a top vertical portion for mounting an adapter or article to be supported thereon, a neck, a main body portion and a tip portion including a distal end forming a wedge or pointed segment. An inner bend diameter of a selected size such as ¼ inch bar stock, ³⁄₁₆ inch bar stock, ½ inch bar stock, ⅝ inch bar stock, and ⅜ inch bar stock. The ⅜ inch rotary auger support includes an effective helical pitch of 2 for every 3.5 revolutions and a variable pitch of 3.0 for every 0.25 revolutions. The pitch diameter of 1.375 inches has a helical pitch of 2.0 inches. As best illustrated in FIG. 6 the angle of the twists forming the flights of the helix of the main body portion are angled forming a plane at 30 degrees shown as angle "A", however, the range could extend from 15 to 45 degrees.

Figure 7:
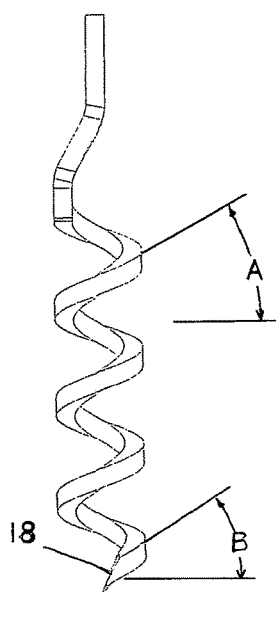
FIG. 7 is a perspective view showing the angle of the twists forming the flights of the helix stock surface and the angle of the wedge shaped tip.
Figure 8:
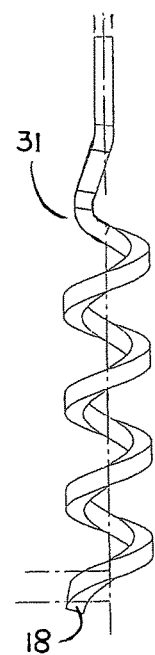
FIG. 8 is a perspective view showing the proportions of the top distal portion, neck, main body portion and the tip segment.
Figure 9:
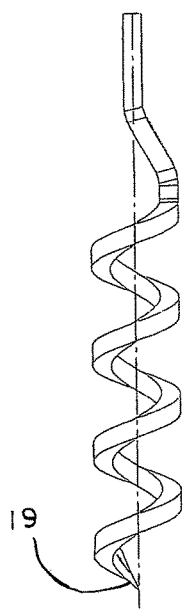
FIG. 9 is a perspective view showing the angle of the twists forming the flights of the helix stock surface and round pointed tip.

As shown in FIGS. 7-8, the square bar stock is ⅜ inch in width and the distal end of the tip forming a penetrating or cutting edge is cut at a 33 degree angle, Angle "B", forming an angled wedge of ⅝ inch in length forming a tip comprising a cutting wedge point 18 for easy insertion into rocky ground and grounds containing roots. It is contemplated that the angle of the wedge could range from 15 to 45 degrees depending upon the application. As shown in FIG. 8, the top section 1 is about 4 inches in length, the main body portion 2 comprises four helixes totaling seven inches in length, and the bottom section 3 is about 0.625 inches in length. A round or pointed tip 19 may also be utilized for particular types of substrates such as clay soil as shown in FIG. 9.

Figure 11:
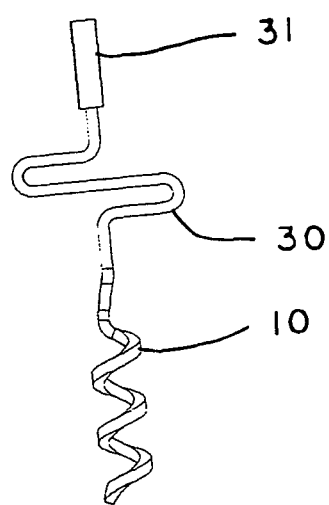
FIG. 11 is a perspective view of a helical auger support having a "S" shaped loop handle extending from the helical auger which includes a mounting means comprising a coupling for holding an article thereon.
Figure 10:
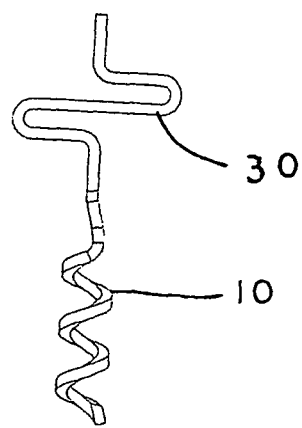
FIG. 10 is a front plan view of a tie down with a "S" shaped loop handle extending from the helical auger.

As shown in FIGS. 10-11, a "S-shaped" loop handle 30 may be integrally formed in a portion of the shaft of the auger extending above the ground. The handle top portion comprises at least one curved "S" shaped loop portion extending upwardly from a top distal end of the elongated rod, the "S" shaped loop portion including a first straight section extending outwardly from the elongated rod at a selected angle from the top distal end of the elongated rod. A first curved end section extends from a distal end of the first straight section returning 180 degrees extending inwardly toward the elongated rod forming a second straight section spaced apart, parallel, and in alignment with the first straight section extending past the elongated rod. A second opposing curved end section returns 180 degrees extending inwardly forming a third straight section extending from the second opposing curved end section spaced apart, parallel, and in alignment with the first straight section and the second straight section. A means for mounting an article to the top distal end of the top portion of the elongated shaft extending upward from the handle 30 may include a coupling or other mounting means for holding an supporting a selected article above the auger which anchors the support stand in the ground.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A rotary auger support comprising:
 a) a helical auger portion comprising:
  I) a selected length of bar stock having a square cross sectional area including a bottom portion bent into a helix comprising:
  ii) a vertical straight top segment;
  iii) a neck portion extending downward from said vertical straight top segment;
  iv) a main body portion extending downwardly from said neck portion, said main body portion comprising a helical coil extending downward therefrom a selected distance and having a helical pitch of 2 for every 3.5 revolutions and a variable pitch of 3.0 for every 0.25 revolutions;
  v) a distal end segment comprising a half helical coil extending downward from said main body portion; and vi) said distal end segment including a point for penetration into the ground;
b) a handle extending upward from said vertical straight top segment;
c) a vertical straight top portion; and
d) means for mounting an object thereon extending from a top distal end of said vertical straight top portion.

2. The rotary auger support of claim 1, wherein said main body portion comprises a pitch diameter of 1.375 inches and a helical pitch of 2.0 inches.

3. The rotary auger support of claim 1, wherein said helical coil of said helical auger portion including said main body portion and said distal end segment comprises a square bar stock defines a cutting edge at each corner of said square bar stock.

4. The rotary auger support of claim 1, said handle comprising a curved rod portion having at least one "S" shaped loop extending upwardly from a top distal end of said medial section comprising a rod having at least two opposing looped sections spaced apart from and in alignment with one another, said at least two opposing looped sections including a first portion extending outwardly from said medial section at a right angle and a second portion extending upwardly over and spaced apart from and in alignment with said first portion forming a first curved loop extending past medial section a selected equal distance from said medial section and a third top portion extending upwardly over and spaced apart from and in alignment with said second portion forming a second curved portion extending a selected distance in alignment with said medial section.

5. The rotary auger support of claim 1, wherein said mounting means extending from a distal end of said vertical straight top portion comprises a coupling.

6. The rotary auger support of claim 1, including a mounting means comprising a lug extending from a distal end of said vertical straight top portion.

7. The rotary auger support of claim 1, wherein said mounting means extending from a distal end of said vertical straight top portion comprises a sleeve.

* * * * *